F. B. DUNN.

PAVING BRICK.

Jan. 19, 1932.

Re. 18,336

Original Filed May 2, 1919

Inventor
Frank B. Dunn
By J. G. H. Stingson
Attys.

Reissued Jan. 19, 1932 Re. 18,336

UNITED STATES PATENT OFFICE

FRANK B. DUNN, OF CONNEAUT, OHIO, ASSIGNOR TO THE DUNN WIRE-CUT LUG BRICK COMPANY, OF CONNEAUT, OHIO, A CORPORATION OF OHIO

PAVING BRICK

Original No. 1,397,505, dated November 22, 1921, Serial No. 294,226, filed May 2, 1919. Application for reissue filed April 10, 1931. Serial No. 529,261.

My invention relates to paving brick, and particularly to that type thereof known to the brick industry as "wire-cut" brick.

The objects of my invention are to provide a side surface of preferably a wire-cut brick with a plurality of spacing studs, lugs or projections of uniform dimensions adapted to space the bricks uniformly apart when laid in a pavement, and preferably with depressions adjacent to said studs adapted to receive said projecting studs when two bricks are reversely placed together, thus allowing the flat surface of adjoining bricks to contact when stacked for drying and burning during manufacture, to prevent the crushing of said studs and destroying their uniformity, and preventing the bending of the bricks during manufacture; said grooves also facilitating the flow of binder material between the bricks when laid in a pavement.

The features of my invention are hereinafter fully described and pointed out and are illustrated in the accompanying drawings in which.

Figure 1:
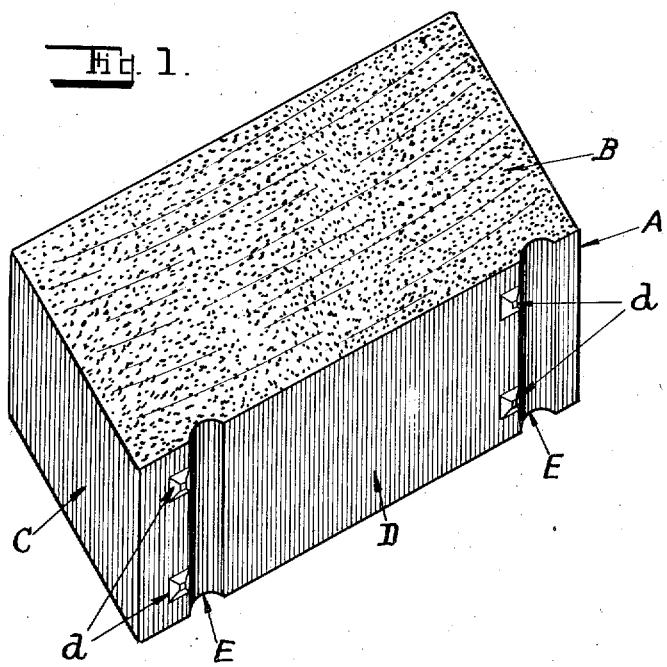
Figure 1 is a perspective view of a wire-cut paving brick embodying my invention.
Figure 2:
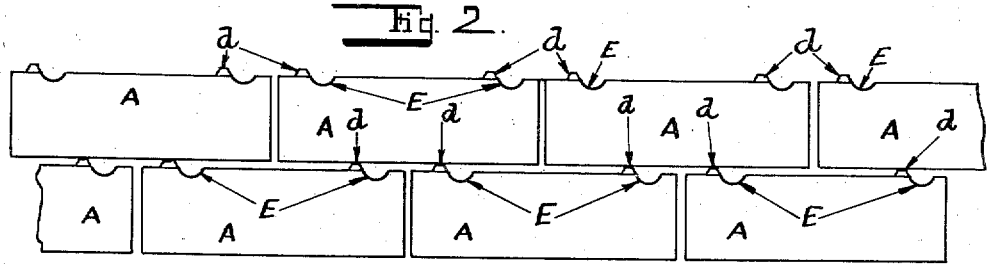
Figure 2 is a plan view of the same as laid in a pavement.
Figure 3:
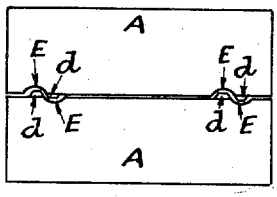
Figure 3 shows the same as stacked for drying and burning.

In these drawings A indicates a paving brick having wire-cut surfaces B, and die-formed surfaces C and D. On one of the die-formed surfaces D, I mold projecting spacing studs *d* of uniform height adapted to maintain uniform spaces between the courses of bricks when laid in a pavement. These projections or spacing studs *d* being formed on the brick A while the same is in plastic condition, it is necessary to provide means to protect said projecting studs when said bricks are stacked for drying or burning, as illustrated in Fig. 3, so that they will not become distorted and their uniformity of height destroyed. For this purpose I provide, adjacent to the projecting studs *d*, depression E of sufficient depth and width to receive the projecting studs of an adjacent brick therein, when the bricks are stacked for drying or burning, as shown in Fig. 3; and also permits the flat surfaces of the brick at each side of said depressions E to contact when stacked for drying and burning, thereby preventing the brick from becoming bent or otherwise distorted during the process of drying and burning.

From the foregoing description taken in conjunction with the drawings, it will be noted that each brick is provided with coacting sets of studs and depressions and that the studs and depressions are so positioned with relation to each other that the studs of one brick will register in the depressions of another brick when reversely placed thereon. More specifically stated, one face of each brick is provided with two or a plurality of sets of lugs and grooves, the lugs being of less height and width than the depth and width of the grooves and the grooves of one set being located between the adjacent lugs and the end of the brick while the lugs of the other set are located between the groove and the end of the brick. It is important that the height of the studs *d* be less than the depth of the depressions E so that the studs will clear the walls of the depressions and the opposed surfaces of two nested bricks contact with each other over all of the flat portions. Each brick will thus be in contact with its opposed brick over relatively large flat surfaces, the upper brick will be well supported against sagging and both bricks will be protected against injury to either the lugs or grooves. In fact it is preferred to have plenty of clearance between the lugs and grooves so that the stacking operation may be carried on rapidly without wasting time in determining whether or not the studs are in exact registration with the depressions. As the grooves or depressions extend the full width of the brick, the lugs and grooves will register at any point along said width when two bricks are nested in reverse order, which features further facilitates the stacking operation. The fact that the studs and depressions are formed on the safe surface of each brick simplifies their formation. This surface, as shown, is the uncut surface, and it is of particular advantage in drying that the bricks be stacked or nested with their cut surfaces exposed, in view of the fact that moisture escapes or passes more readily from the brick through the wire-cut surface than the surfaces which contact with and are smoothed by the die, as this smoothing and pressing action closes the pores or reduces the porosity of said surfaces, as is well understood.

Another feature of advantage in stacking resides in the feature of so locating the cooperating grooves and lugs that when the bricks are stacked in reverse order, the ends of the bricks will automatically lie in the same vertical plane or will have flush ends, thus ensuring orderly stacking and maximum and uniform capacity in loading.

Having thus fully described my invention so as to enable others to utilize the same, what I claim as new and desire to secure by Letters Patent is:—

1. As an article of manufacture, an unpressed paving brick cut from a continuous column of clay having two transverse grooves in one of the die-formed surfaces thereof, and perimetrical studs projecting from the surface of said die-formed surface adjacent to the same relative side of each of said transverse grooves, substantially as set forth.

2. As an article of manufacture, a paving brick having two transverse grooves in one of the surfaces thereof, and spaced alined perimetrical studs projecting from the same surface adjacent the same relative side of each of said grooves, the said studs being of less height than the depth of said grooves and registering therewith when one brick is reversely placed upon another, as and for the purposes specified.

3. As an article of manufacture, a paving brick provided with three smooth unbroken side surfaces, the remaining side surface being formed with sets of transverse grooves, and perimetrical studs adjacent the same relative side of each of said grooves, said studs being spaced apart in transverse alinement and of less height than the depth of said grooves and registering therewith when one brick is reversely placed upon another, as and for the purposes specified.

4. As an article of manufacture, a paving brick having on one face thereof a transverse groove located near one end of the brick and a stud adjacent said groove of less height and width than the depth and width of the groove, and another similar groove and stud near the other end of the brick located in reverse order with respect to said first-named groove and stud.

5. As an article of manufacture, a paving brick having on one of its faces near one end of the brick a transverse groove and transversely alined spaced studs adjacent the groove of less height and width than the depth and width of the groove, and another similar groove and alined spaced studs near the other end of the brick located in reverse order with respect to said first-named groove and studs.

6. As an article of manufacture, a paving brick having on one of its faces near one end of the brick a transverse groove and transversely alined spaced studs adjacent the groove of less height and width than the depth and width of the groove, and another similar groove and alined spaced studs near the other end of the brick located in reverse order with respect to said first-named groove and studs, the remainder of the face of the brick being substantialy flat.

7. As an article of manufacture, a wire-cut paving brick having located on one of the uncut surfaces thereof at least two transverse grooves and transversely aligned studs adjacent the same relative side of each of said grooves and of less height and width than the depth and width of the grooves, said studs of one brick registering with the grooves of another brick when one brick is reversely placed upon another.

8. As an article of manufacture, a paving brick having on one face thereof at least two transverse grooves and transversely aligned studs adjacent the same relative side of each of said grooves and of less height and width than the depth and width of the grooves, said grooves being of equal depth the full width of the face of the brick.

9. As an article of manufacture, a paving brick having on one face thereof at least two transverse grooves extending the full width of said face and transversely aligned studs on the same relative side of each of said grooves and of less height and width than the depth and width of the grooves, said grooves and studs being so located with respect to one another that a plurality of bricks when stacked in alternately reverse order will automatically assume a position in which the ends of the bricks lie in substantially the same vertical plane.

FRANK B. DUNN.